(12) United States Patent
You et al.

(10) Patent No.: US 11,880,770 B2
(45) Date of Patent: Jan. 23, 2024

(54) 3D OBJECT RECOGNITION USING 3D CONVOLUTIONAL NEURAL NETWORK WITH DEPTH BASED MULTI-SCALE FILTERS

(71) Applicant: Intel Corporation, Santa Clara, CA (US)

(72) Inventors: Ganmei You, Beijing (CN); Zhigang Wang, Beijing (CN); Dawei Wang, Beijing (CN)

(73) Assignee: INTEL CORPORATION, San Francisco, CA (US)

( * ) Notice: Subject to any disclaimer, the term of this patent is extended or adjusted under 35 U.S.C. 154(b) by 548 days.

(21) Appl. No.: 17/059,967

(22) PCT Filed: Aug. 31, 2018

(86) PCT No.: PCT/CN2018/103645
§ 371 (c)(1),
(2) Date: Nov. 30, 2020

(87) PCT Pub. No.: WO2020/042169
PCT Pub. Date: Mar. 5, 2020

(65) Prior Publication Data
US 2021/0209339 A1    Jul. 8, 2021

(51) Int. Cl.
*G06N 3/084* (2023.01)
*G06N 3/04* (2023.01)
(Continued)

(52) U.S. Cl.
CPC .......... *G06N 3/084* (2013.01); *G06F 18/213* (2023.01); *G06N 3/04* (2013.01); *G06V 10/454* (2022.01);
(Continued)

(58) Field of Classification Search
CPC .... G06V 10/454; G06V 10/764; G06V 10/82; G06V 20/56; G06V 20/58; G06V 20/64; G06N 3/04; G06F 18/213
See application file for complete search history.

(56) References Cited

U.S. PATENT DOCUMENTS

2017/0032222 A1* 2/2017 Sharma ............... G06V 30/194
2017/0076195 A1 3/2017 Yang et al.
(Continued)

FOREIGN PATENT DOCUMENTS

| CN | 105975931 | 9/2016 |
|---|---|---|
| CN | 107862261 | 3/2018 |
| WO | 2017096570 | 6/2017 |

OTHER PUBLICATIONS

International Search Report and Written Opinion for PCT Application No. PCT/CN2018/103645, dated Apr. 28, 2019.
(Continued)

*Primary Examiner* — Ross Varndell
(74) *Attorney, Agent, or Firm* — Akona IP PC

(57) ABSTRACT

Techniques related to training and implementing convolutional neural networks for object recognition are discussed. Such techniques may include applying, at a first convolutional layer of the convolutional neural network, 3D filters of different spatial sizes to an 3D input image segment to generate multi-scale feature maps such that each feature map has a pathway to fully connected layers of the convolutional neural network, which generate object recognition data corresponding to the 3D input image segment.

21 Claims, 8 Drawing Sheets

(51) Int. Cl.
    *G06V 20/64*     (2022.01)
    *G06V 10/44*     (2022.01)
    *G06V 20/56*     (2022.01)
    *G06F 18/213*     (2023.01)
    *G06V 10/764*     (2022.01)
    *G06V 10/82*     (2022.01)
    *G06V 20/58*     (2022.01)

(52) U.S. Cl.
    CPC ............ *G06V 10/764* (2022.01); *G06V 10/82* (2022.01); *G06V 20/56* (2022.01); *G06V 20/58* (2022.01); *G06V 20/64* (2022.01)

(56) References Cited

U.S. PATENT DOCUMENTS

2018/0032844 A1     2/2018    Yao et al.
2021/0334578 A1*   10/2021   Lim ........................ G06N 3/045

OTHER PUBLICATIONS

Bogoslavskyi, I. et al., "Fast Range Image-Based Segmentation of Sparse 3D Laser Scans for Online Operation", 2016 IEEE/RSJ International Conference on Intelligent Robots and Systems (IROS) Daejeon Convention Center, Oct. 9-14, 2016, Daejeon, Korea. pp. 163-169 (7 pages).

Chen, et al., "Multi-view 3D object detection network for autonomous driving", International Conference on Computer Vision and Pattern Recognition (CVPR); 2017.

Maturana, D. et al., "Voxnet: A 3d convolutional neural network for real-time object recognition", IEEE/RSJ International Conference on Intelligent Robots and Systems (IROS); 2015; pp. 922-928.

Wu, Z. et al., "3D shapenets: A deep representation for volumetric shape modeling", in CVPR 2015.

International Preliminary Report on Patentability for PCT Application No. PCT/CN2018/103645, dated Mar. 11, 2021.

* cited by examiner

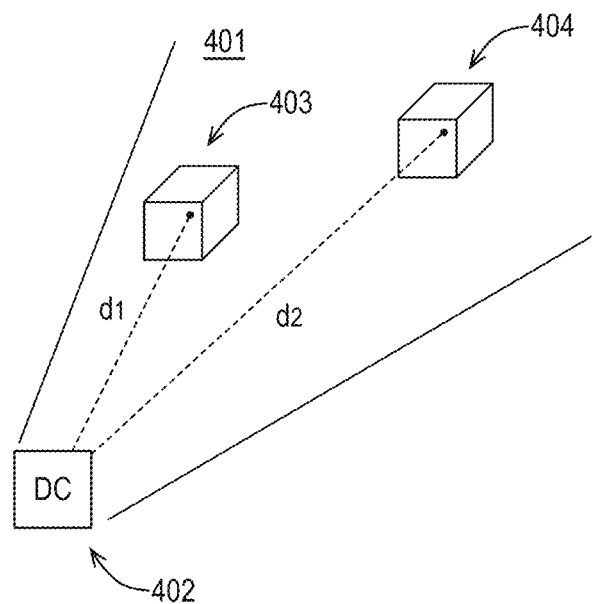
FIG. 4
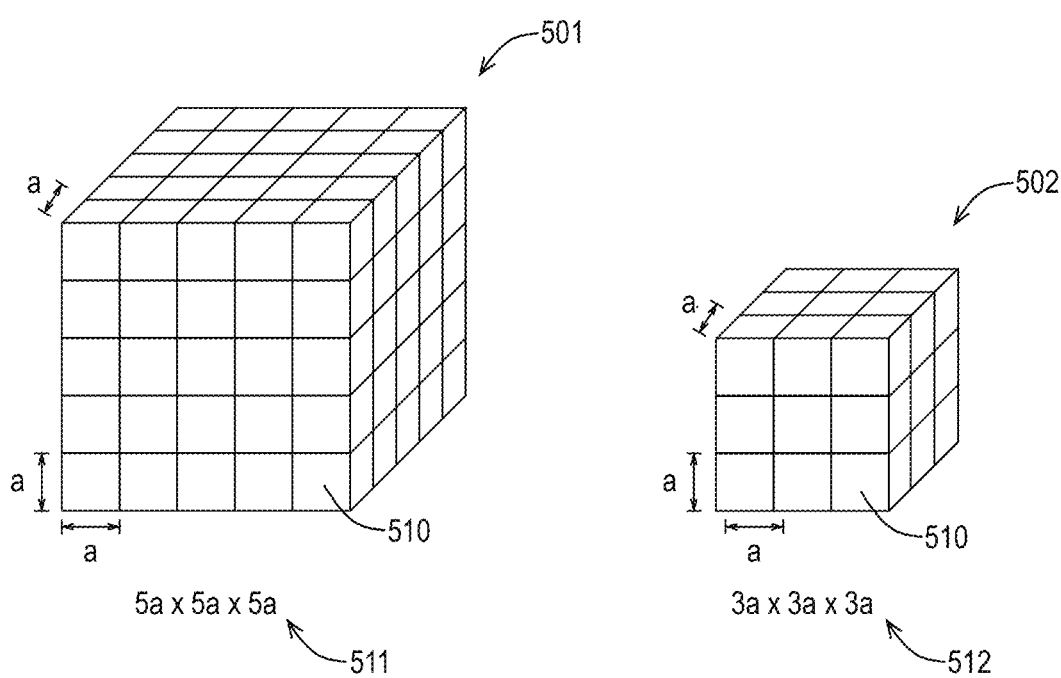
FIG. 5A
FIG. 5B

3D OBJECT RECOGNITION USING 3D CONVOLUTIONAL NEURAL NETWORK WITH DEPTH BASED MULTI-SCALE FILTERS

CLAIM OF PRIORITY

This Application is a National Stage Entry of, and claims priority to, PCT Application No. PCT/CN2018/103645, filed on 31 Aug. 2018 and titled "3D OBJECT RECOGNITION USING 3D CONVOLUTIONAL NEURAL NETWORK WITH DEPTH BASED MULTI-SCALE FILTERS", which is incorporated by reference in its entirety for all purposes.

BACKGROUND

Semantic object recognition may include identifying objects in an image or images and correctly labeling the identified object. Such semantic object recognition techniques have a wide range of applications. For example, semantic object recognition is an important capability for autonomous driving (AD) and autonomous robot (AR) applications. Current object recognition techniques may use RGB images (with each pixel having red, green, and blue values) to recognize objects. In some examples, key points of objects are identified in the RGB images, features are extracted from the key points, and the extracted features are used to identify objects. For example, if key points are matched, the pertinent object is matched and recognized. In such implementations, extracted features of objects at near distances from the camera cannot be used to detect objects at far distances from the camera and vice versa. Furthermore, RGB-D image data (with each pixel having red, green, and blue values and a depth value) is becoming more readily available as RGB-D sensors such as depth cameras are applied in AD and AR applications.

It may be advantageous to perform object recognition with high accuracy, and with less computational and memory resource requirements. It is with respect to these and other considerations that the present improvements have been needed. Such improvements may become critical as the desire to perform semantic object recognition becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4 illustrates example 3D input image segments;

FIGS. 5A and 5B illustrate example 3D filters of differing spatial sizes;

DETAILED DESCRIPTION

Figure 1:
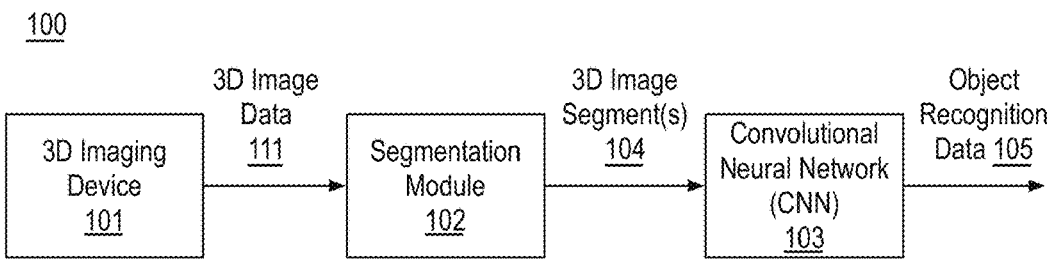
FIG. 1 illustrates an example device for performing semantic object recognition using 3D image data.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein. As used herein the terms "approximately" or "substantially" indicate a deviation from the target value of +/−5% unless otherwise specified.

Methods, devices, apparatuses, computing platforms, and articles are described herein related to 3D object recognition using 3D convolutional neural networks with depth based multi-scale filters.

As described above, it may be advantageous to perform semantic object recognition in a variety of contexts. Furthermore, 3D image data in a variety of formats such as RGB-D formats are becoming more widespread. As is discussed herein, a convolutional neural network (CNN) for semantic object recognition in 3D image data may include a first convolutional layer of the CNN that applies multiple 3D filters such that some of the 3D filters in the first convolutional layer are of different 3D spatial sizes. As used herein, the term 3D spatial size with respect to a CNN 3D filter indicates the volume the filter is applied to in spatial dimensions in 3D space. Different 3D filters of differing 3D spatial sizes therefore are applied over different spatial volumes and dimensions in 3D space. In an embodiment, the 3D filters each have cells that are of the same spatial size (i.e., are to filter over the same spatial size in 3D space) such as $(0.1 \text{ m})^3$ or the like and the 3D filters of differing 3D spatial sizes include differing numbers of such cells. For example, a larger 3D filter may be 10×10×10 cells (i.e., a size of 1 m$^3$) while a smaller 3D filter may be 5×5×5 cells (i.e., a size of 0.125 m$^3$. Any number of different sizes of 3D filters may be used (e.g., 3 different sizes or more) and any number of each size may be employed (e.g., 10 of each size or more or different numbers of each filter size). Application of each filter may generate a particular feature map. Furthermore, the first convolutional layer of the CNN may include a pooling operation for each of the filtered results (e.g., filter maps). For example, each 3D filter size may have a corresponding pooling size that performs max pooling or the like to downsample the feature map. The results from the optional pooling may also be characterized as feature maps. As used herein, the term convolutional layer indicates a layer of a CNN that provides a convolutional filtering as well as other related operations such as rectified linear unit (ReLU) operations, pooling operations, and/or local response normalization (LRN) operations. In an embodiment, each convolutional layer includes convolutional filtering and pooling operations. The output of a convolutional layer is characterized as a feature map. Such feature maps indicate or score the likelihood particular features are in the filtered volume (e.g., a 3D input image or image segment at the first convolutional layer and a feature map at subsequent convolutional layers) and serve to locate the feature within the filtered volume.

The results from some of the 3D filter sizes (e.g., one or more larger filter sizes) may be applied to a second convolutional layer of the CNN, which also applies 3D filters and optional pooling or other operations to generate feature maps. Such resultant feature maps may be applied to a third convolutional layer of the CNN (or more) and, eventually, final feature maps in the processing path are provided as a feature vectors to a first fully connected layer of the CNN. Furthermore, results from other 3D filter sizes of the first convolutional layer (e.g., one or more smaller filter sizes) of the CNN, in some embodiments, bypass the second convolutional layer of the CNN and are provided as feature vectors to the first fully connected layer. The first fully connected layer receives all such feature vectors (e.g., from the first convolutional layer, second convolutional layer, third convolutional layer, etc.) and processes them to one or more additional fully connected layers to provide object recognition data corresponding to the input 3D image data. The object recognition data may be in any suitable format and provides likelihoods the input 3D image data corresponds to a particular object (e.g., car, pedestrian, motorcycle, building, etc. in an automated driving context), a most likely label, or similar data indicating the object, if any, identified in the 3D image.

For example, the systems and techniques discussed herein provide a distance based 3D CNN that utilizes multi-scale filters to extract multi-scale features from an input 3D image segment (e.g., a RGB-D image segment). In an embodiment, in the multi-scale filters of the first convolutional layer of the CNN, the size of each cell of each 3D filter has a fixed spatial resolution or size such that the pixel number, during filtering, in each cell differs based on the distance or depth of the volume being filtered from the camera. For each scale or size of filter of the first convolutional layer, there is a pathway to the first fully connected layer of the CNN. The feature vectors provided to the first fully connected layer of the CNN are processed to generate the object recognition data corresponding to the input 3D image segment. Using such techniques, in CNN training, extracted features of objects at large depth/far distance can be used to detect objects at small depth/near distance to camera and vice versa. Furthermore, in implementation, each 3D input image segment (e.g., each RGB-D image segment) is classified into a category as represented by the object recognition data.

FIG. 1 illustrates an example device 100 for performing semantic object recognition using 3D image data, arranged in accordance with at least some implementations of the present disclosure. As shown in FIG. 1, device 100 includes a 3D imaging device 101, a segmentation module 102, and a convolutional neural network (CNN) module 103. Device 100 may be implemented in any suitable form factor device such as motor vehicle platform, a robotics platform, a personal computer, a laptop computer, a tablet, a phablet, a smart phone, a digital camera, a gaming console, a wearable device, a display device, an all-in-one device, a two-in-one device, or the like. For example, device 100 may perform object recognition as discussed herein.

As shown, 3D imaging device 101 attains 3D image data 111. 3D imaging device 101 may be any suitable 3D imaging device. In an embodiment, 3D imaging device 101 includes a left camera, a right camera, and an IR transmitter such that IR transmitter 106 projects an IR texture pattern onto a scene. An IR texture pattern residual is obtained when an image or image data are captured corresponding to the projected pattern by the left and right camera. Using the resultant captured IR texture patterns, 3D imaging device 101 may perform stereoscopy to generate depth values of 3D image data 111. Furthermore, the left and/or right cameras may attain color image data for the scene. Such image data may be combined as 3D image data 111, which may have any suitable format such as an RGB-D format. For example, 3D image data 111 may include input pixel values for each pixel of an input image and the input pixel values may be provided for each channel of a color space such as R (red), G (green), B (blue), and D (depth) values for input image data. Although discussed with respect to IR patterning projection, color and IR image capture, and stereoscopy, 3D image data may be generated using any suitable 3D imaging techniques such as stereoscopy using only color image data, laser scanning of the scene, etc.

3D image data 111 is received by segmentation module 102 and 3D image data 111 is segmented into one or more 3D image segments 104 such that each segment of 3D image segments 104 includes image data for a potential object in the scene. Such segmentation may be performed using any suitable technique or techniques. In an embodiment, segmentation module 102 transforms 3D image data 111 in a 3D point cloud representation of the 3D image data and segmentation module 102 performs segmentation by 3D spatial clustering such that points of the point clouds that are clustered together are combined into a particular 3D image segment. In other embodiments, other data attained from the scene (not shown) such as laser scan data or the like may be used to generate a point cloud used for segmentation, which is then applied to 3D image data 111 to generate 3D image segments 104.

Each of 3D image segments 104 are provided, separately, to CNN module 103, which implements a CNN that has been pre-trained as discussed further herein. CNN module 103 implements a distance based multi-scale 3D CNN to classify objects within 3D image segments 104. In the first convolutional layer of the CNN implemented by CNN module 103, multi-scale filters extract multi-scale features from each of 3D image segments 104. For example, the first convolutional layer includes multiple filters of multiple different scales or sizes. That is, the first convolutional layer implements n filters of a first scale or size, m filters of a second scale or size, and so on for any number of different scales or sizes.

In some embodiments, for each filter size, each cell thereof is a fixed spatial resolution (e.g., $(0.1 \text{ m})^3$) such that, during filtering of 3D image segments, the pixel number in each cell is different depending on the distance/depth of the particular 3D image segment from the camera. In an embodiment, each cell discussed herein applies a filter weight. That is, the weight of each cell may by multiplied by a value of the volume being filtered (e.g., a pixel value or feature map value) and the sum (or a normalized sum) of the products of the weights and values may be the output of the 3D filter. Each filter of the first convolutional layer (e.g., at every scale or size) has a pathway to the fully connected layer of the CNN implemented by CNN module 103. For example, for larger 3D filters, the path to the fully connected layer may be through one or more additional convolutional layers. For smaller 3D filters, the path to the fully connected layer may be direct and the one or more additional convolutional layers may be bypassed or the path may include one or more additional convolutional layers and one or more bypassed convolutional layers.

As discussed, the CNN implemented by CNN module 103 is pretrained to determine parameter weights of the CNN. During implementation (or object inference), the CNN classifies each of 3D image segments 104 into a category to provide object recognition data 105. Object recognition data 105 may include any suitable data representing object recognition such as a probability corresponding to each available object label (e.g., an array of probabilities each between 0 and 1 for the available object labels), a most likely object label, etc. Using such techniques, features of different scales are extracted from 3D image segments 104 and such features are used to classify objects in 3D image segments 104. For example, the same type of objects at different distances or depths share some features. During training and subsequent implementation, extracted features of objects at large depth/far distance can be used to detect objects at small depth/near distance to camera and vice versa. Such techniques provide more accurate object recognition and classification, which improves device performance. Such improvements are critical in a wide variety of contexts including artificial intelligence applications, autonomous driving applications, unmanned aerial vehicle applications, autonomous robot applications, etc.

Figure 2A:
FIGS. 2A and 2B illustrate example images having objects to be detected at different camera depths.
Figure 2B:
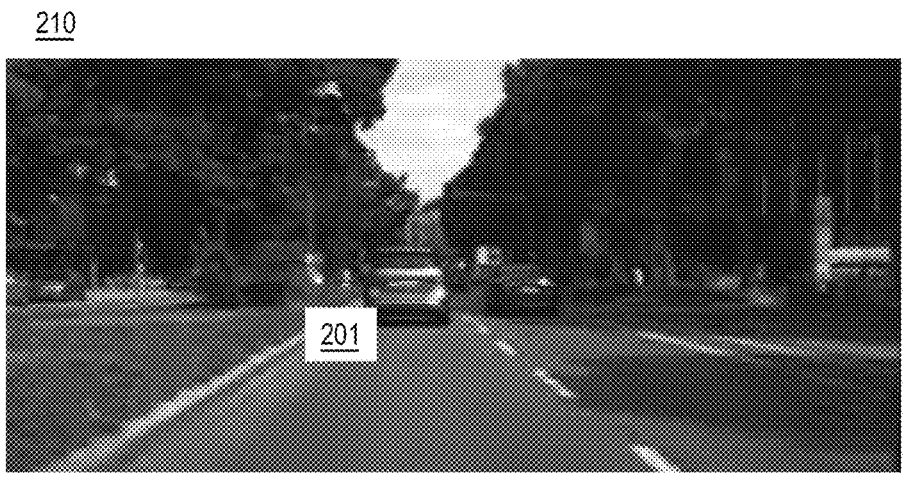

FIGS. 2A and 2B illustrate example images having objects to be detected at different camera depths, arranged in accordance with at least some implementations of the present disclosure. In FIG. 2A, image 200 includes an object 201 (e.g., a motor vehicle) at a first depth from an image sensor of a camera (not shown). In FIG. 2B, image 210 includes object 201 at a second depth greater than the first depth from the image sensor. As shown in FIGS. 2A and 2B, although the features (e.g., feature points, feature lines, etc.) of object 201 are not the same (e.g., they have different sizes, orientations, and orientations with respect to one another) between image 200 and image 210, they share the same or similar structures. Such similarities may be leveraged using the multi-scale filters discussed herein during training and implementation of a CNN to accurately recognize object 201 at different depths within 3D image data 111.

Figure 3:
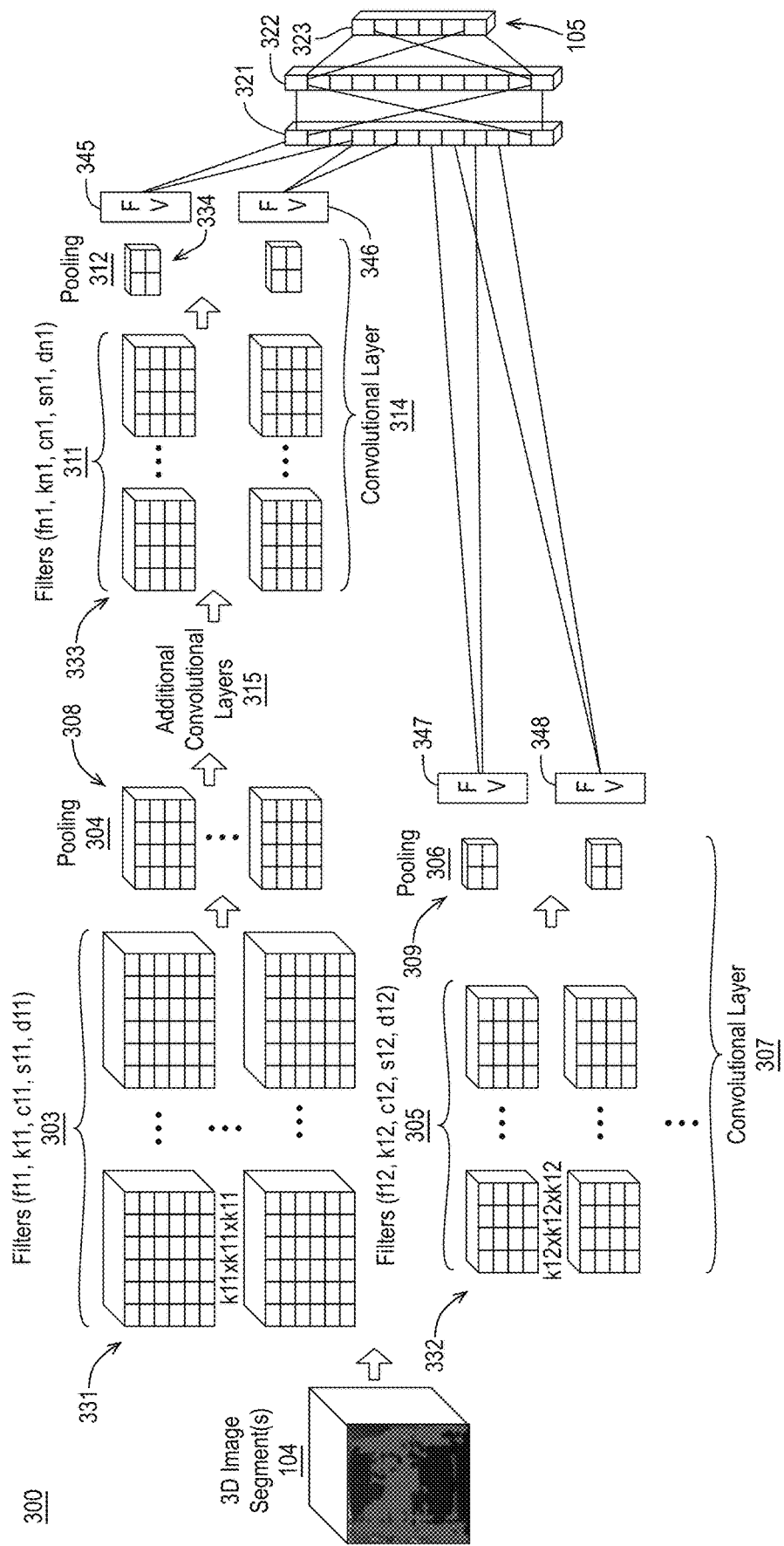
FIG. 3 illustrates an example convolutional neural network for object recognition.

FIG. 3 illustrates an example convolutional neural network 300, arranged in accordance with at least some implementations of the present disclosure. For example, convolutional neural network (CNN) 300 may be implemented by CNN module 103. As shown, CNN 300 includes a convolutional layer 307 that receives 3D image segments 104 (e.g., convolutional layer 307 is a first convolutional layer), any number of additional convolutional layers 315, if any, and a convolutional layer 314 such that convolutional layer 314 is immediately adjacent to fully connected layers 321, 322. (e.g., convolutional layer 314 is a final convolutional layer).

CNN 300 receives 3D image segments 104, which may be segmented from 3D input image data as discussed herein. Each of 3D image segments 104 may be, for example, an RGB-D format image segment, which, as illustrated, represents a 3D segment of 3D image data. For example, 3D filters 303, 305 of different scales or sizes, as discussed below, may be applied to 3D image segment 104 and each filter may extract a particular feature (e.g., a vertical line, a horizontal line, a boundary, a shape, etc.) and its location, if present, in 3D image segment 104 to provide multi-scale feature detection. Notably, 3D image segments 104 may be expected to include an object to be classified.

CNN 300 may include any number of convolutional layers 307, 314, 315. In the illustrated embodiment, CNN 300 includes a first convolutional layer 307 and a final convolutional layer 314 and any number of intervening convolutional layers 315. Notably, convolutional layers 315 may include 3D filters and pooling modules (not shown) as discussed with respect to convolutional layers 307, 314. Furthermore, in the illustrated embodiment, feature maps 308 (as generated by larger 3D filters 303) are provided to convolutional layers 315 while feature maps 309 (as generated by smaller 3D filters 305) bypass convolutional layers 315 and convolutional layer 314. As used herein, the term feature map indicates any suitable data structure indicating features within the previous feature map or input data. For example, a feature map may include a 3D array of values indicative of such features. Such feature maps may be characterized as response maps or the like. In embodiments where convolutional layer 307 includes 3D filters of sizes smaller than 3D filters 305, the resultant feature maps also bypass convolutional layers 315 and convolutional layer 314. In embodiments where convolutional layer 307 includes 3D filters of sizes larger than 3D filters 305 and smaller than 3D filters 303, the resultant feature maps may bypass convolutional layers 315 and convolutional layer 314 or they may be processed by one or more of additional convolutional layers 315 and bypass convolutional layer 314 and, optionally, one or more of additional convolutional layers 315.

In any event, each of 3D feature maps 308, of feature maps 309, and any other feature maps generated by convolutional layer 307 have a pathway to fully connected layer 321, fully connected layer 322, and output layer 323. Furthermore, since 3D image segments 104 may have four channels (e.g., R, G, B, D), for each 3D filter 303, 305 in convolutional layer 307, there may be four corresponding fibers. As shown, in an embodiment, feature maps 308, each corresponding to one of filters 303 are processed by additional convolutional layers 315. In operation, each 3D filter 331 of 3D filters 303 is applied to a receptive field of 3D image segment 104 and generates a filtered result. Each 3D filter 331 is then moved within 3D image segment 104 to another receptive field to generate a second filtered result, and so on, to generate 3D feature maps, which may be optionally pooled (e.g., max pooled) to form feature maps 308. As discussed herein, filter weights of each 3D filter 331 are pretrained in a training phase for implementation in an implementation phase. Each 3D filter 331 is tuned to detect a particular feature relevant to object detection within 3D image segment 104. Each 3D filter 331 may be characterized as a filter, kernel, neuron, etc. For example, each 3D filter 331 is convolved with 3D image segment 104. The results from application of each 3D filter 331 are optionally downsampled by a pooling module or modules 304 to generate 3D feature maps 308. The pooling, and any pooling operations discussed herein, may be performed with any suitable size and stride.

Similarly, each of 3D feature maps 308 are provided to a convolutional layer including multiple 3D filters and corresponding pooling modules of convolutional layers 315 (if any) for processing as discussed above. The resultant 3D feature maps (or feature maps 308 if no additional convolutional layers 315 are implemented) are provided to convolutional layer 314, which operates as discussed with respect to convolutional layer 307 such that each 3D filter 333 of 3D filters 311 are applied to a receptive field of 3D feature maps 308 to generate a filtered result and each 3D filter 333 is moved within 3D feature maps 308 to another receptive field to generate a second filtered result, and so on. Each 3D filter 333 is tuned to detect a particular feature relevant to object detection within 3D image segment 104. Notably, each 3D filter 333 may detect more abstract features than each 3D filter 331 as processing through CNN 300 progresses. The results from application of each 3D filter 331 are optionally downsampled by a pooling module or modules 312 to generate feature maps 334. Feature maps 334 are vectorized to feature vectors 345, 346 (only two of which are shown for the sake of clarity), which are provided (along with other feature vectors, as discussed below) to first fully connected layer 321. Feature vectors 345, 346 may be generated from feature maps 334 using any suitable technique or techniques such as translating 3D results to a linear order using a scan order such as a raster scan order or the like. in an embodiment, each feature vector is an 8-element vector (corresponding to 2×2×2 3D feature maps), although any size may be used. Such feature vectors may be characterized as feature maps, neural features, neural feature vectors, or the like Similarly, each 3D filter 332 of 3D filters 305 is applied to a receptive field of 3D image segment 104 to generate a filtered result. Each 3D filter 332 is then moved within 3D image segment 104 to another receptive field to generate a second filtered result, and so on. Notably, the 3D spatial size of each of 3D filters 305 is less than the 3D spatial size of each of 3D filters 303. In the illustrated embodiment, each of 3D filters 305 includes k12×k12×k12 cells such that each cell is a particular spatial size and each of 3D filters 303 includes k11×k11×k11 cells such that each cell has the same spatial size. As illustrated, k11 is greater than k12 such that the 3D spatial size of each of 3D filters 305 is less than the 3D spatial size of each of 3D filters 303. Each cell may be any suitable size. In an embodiment, each cell has a spatial size in the range of $(0.05 \text{ m})^3$ to $(0.15 \text{ m})^3$. In an embodiment, each cell has a spatial size of approximately $(0.05 \text{ m})^3$. In an embodiment, each cell has a spatial size of approximately $(0.1 \text{ m})^3$. in an embodiment, each cell has a spatial size of approximately $(0.15 \text{ m})^3$. Such cell sizes may be used by any 3D filter discussed herein. The number of cells in each of 3D filters 305 and each of 3D filters 303 may be any suitable numbers. in an embodiment, the number of cells in each of 3D filters 303 is in the range of 8 to 15 cells in each dimension (e.g., k11 is in the range of 8 to 15). In an embodiment, the number of cells in each of 3D filters 305 is in the range of 4 to 8 cells in each dimension (e.g., k12 is in the range of 4 to 8).

As with each 3D filter 331, each 3D filter 332 is tuned to detect a particular feature relevant to object detection within 3D image segment 104 and each 3D filter is convolved with 3D image segment 104 to detect and locate such features. The results from application of each 3D filter 332 are optionally downsampled by a pooling module or modules 306 to generate feature maps 309. Feature maps 309 are vectorized to feature vectors 347, 348 (only two of which are shown for the sake of clarity), which are provided (along with other feature vectors) to first fully connected layer 321. Feature vectors 347, 348 may be generated from feature maps 309 using any suitable technique or techniques such as translating 3D results to a linear order using a scan order. In an embodiment, feature vector is an 8-element vector (corresponding to 2×2×2 3D feature maps), although any size may be used.

As discussed, feature vectors 345, 346, 347, 348 (and others) are provided to fully connected layers 321, 322 to generate object recognition data 105 at output layer 323. For example, fully connected layer 321 may receive any number of feature vectors concatenated into a one dimensional array. For example, each feature vector may be an 8-element vector and, for N feature vectors, fully connected layer 321 has 8×N nodes or elements to receive the feature vectors. Although illustrated with two fully connected layers 321, 322, CNN 300 may include any number of fully connected layers such as three, four, or more. Each of fully connected layers 321, 322 may have any number of inputs and outputs. Output layer 323 includes any number of outputs for any number of object labels (e.g., bike, car, truck, pedestrian, etc. in a motor vehicle context) and output layer 323 may provide respective probability values for the object labels. In an embodiment, the respective probability values for the object labels sum to one. For example, fully connected layers 321, 322 may provide fully connected and weighted network nodes and fully connected output layer 323 may provide a fully connected softmax functions or the like. In some embodiments, object recognition data 105 includes an object label having the highest probability value of the available object label outputs from fully connected layer 323.

As discussed, convolutional layer 307 includes 3D filters 303 of a first size, 3D filters 305 of a second size, and any number of 3D filters of other differing sizes. Thereby, CNN 300 includes depth based multi-scale filters. 3D image segment 104 is input to CNN 300 and different sizes of filters are used in each convolutional layer to extract features of different sizes. Notably, in contrast to CNNs that apply filters of the same size in the first convolutional and thereby extract only features of one size, propagate such features throughout the CNN, and are limited to recognizing objects of limited size ranges, CNN 300 extracts, during both training and implementation, multi-scale features and provides a pathway for such multi-scale features to fully connected layers 321, 322. Such multi-scale feature extraction and propagation through CNN 300 provides for more accurate object recognition. That is, convolutional layer 307 includes 3D filters 303 of a first scale or size and 3D filters 305 of a second scale or size. Although illustrated with first convolutional layer 307 of CNN 300 having two different scales or sizes of 3D filters, first convolutional layer 307 may include multiple 3D filters each of any number of different scales or sizes such as three different scales or sizes, four different scales or sizes, or more. Furthermore, as discussed, the pathway for feature maps from such 3D filters of different scales or sizes may fully bypass convolutional layers 315 and convolutional layer 314 or they may be processed by one or more of convolutional layers 315 and bypass only convolutional layer 314 or they may bypass one or more of convolutional layers 315 and convolutional layer 314.

In the illustration, the parameters of 3D filters 303 (i.e., f11, k11, c11, s11, d11), 3D filters 305 (i.e., f11, k11, c11, s11, d11), and 3D filters 311 (i.e., fn1, kn1, cn1, sn1, dn1) indicate f number of filters of the particular size, k number of cells in each of the 3-dimensions such that each filter is k×k×k cells with a total of $k^3$ cells with each cell being the same spatial size (e.g., $(0.1 \text{ m})^3$), the filter is applied at a step size s for c fibers or channels of the previous layer, with the center of an input segment being at depth d. Notably, the depth of input segments are used to identify and select filters during training but the depth is not used during implementation phase. As discussed, k11 is greater than k12. Other such CNN 300 parameters may be selected, prior to training, to enhance object detection. In an embodiment, f11 is fewer than f12 such that the number of filters of a larger size is fewer than a number of filters of a smaller size. In an embodiment, filters of three sizes are utilized and the number of filters of the large size is fewer than a number of filters of the medium size, which is, in turn, fewer than a number of filters of the small size. In an embodiment, the number of filters increases for each step down in filter size.

FIG. 4 illustrates example 3D input image segments, arranged in accordance with at least some implementations of the present disclosure. As shown in FIG. 4, a depth camera (DC) 402 may be oriented to view a scene 401 including, potentially, a variety of objects at different depths. In the illustrated example, a first 3D image segment 403 is at a first depth d1 from depth camera 402 (e.g., an image sensor of depth camera 402) and a second 3D image segment 404 is at a second depth d2 from depth camera 402 (e.g., an image sensor of depth camera 402). In the illustrated example, both 3D image segments 403, 404 are of the same spatial size (i.e., they are the same size in real space).

However, as will be appreciated, 3D image segment 403 may be represented by more pixels in a 3D image captured by depth camera 402 than 3D image segment 404 is represented by (please refer to FIGS. 2A and 2B where object 201 is represented by more pixels in image 200 than in image 210).

FIGS. 5A and 5B illustrate represent example 3D filters of differing spatial sizes, arranged in accordance with at least some implementations of the present disclosure. As shown in FIG. 5A, a first filter 501 may include cells such as cell 510 such that each cell 510 is the same spatial size. For example, each cell 510 may have a height of 0.1 m, a width of 0.1 m, and a depth of 0.1 m such that each cell has a volume of $(0.1 \text{ m})^3$. However, each cell 510 may have any dimensions discussed herein. Furthermore, each cell 510 may be cubic (as illustrated) or any other shape such as rectangular cuboid. In the illustrated example, each cell is generalized as having a height, width, and depth of a. In FIG. 5A, first filter 501 is, spatially, 5×5×5 cells such that first filter 501 has spatial dimensions 511 of 5a×5a×5a and a volume of $(5)^3$. Similarly, as shown in FIG. 5B, a second filter 502 may include a number of cells such that each cell 510 is the same spatial size as discussed with respect to first filter 501. In FIG. 5B, second filter 502 is, spatially, 3×3×3 cells such that second filter 502 has spatial dimensions 512 of 3a×3a×3a and a volume of $(3a)^3$.

Although illustrated with first filter 501 being 5×5×5 cells and second filter 502 being 3×3×3 cells, first and second filters may include any number of cells such that first filter 501 has more cells than second filter 502. Notably, any number of filters 501, 502 (i.e., at the same sizes but to detect different features) may be implemented via first convolutional layer 307 or any other convolutional layers discussed herein. Furthermore, as discussed, first filter 501 has a larger size or spatial volume with respect to second filter 502. When applied to different 3D image segments of the same size but at different depths, such as 3D image segments 403, 404, the number of segment pixels in each cell of filter 501 differ (e.g., between application to 3D image segment 403 and 3D image segment 404) based on the depth difference between depths d1 and d2 and the corresponding number of pixels representing each of 3D image segments 403, 404. For example, the farther or greater the depth, the larger the spatial size of each pixel of the 3D image segment (i.e., each pixel value represents a larger 3D space) and the fewer pixels in a 3D cell for a fixed spatial resolution. Conversely, the smaller or lesser the depth, the smaller the spatial size of each pixel of the 3D image segment (i.e., each pixel value represents a smaller 3D space) and the greater number of pixels in a 3D cell for a fixed spatial resolution.

As discussed, each cell discussed of a filter applies a filter weight such that the weight of each cell may by multiplied by a value of the volume being filtered (e.g., a pixel value or feature map value) and the sum (or a normalized sum) of the products of the weights and values may be the output of the 3D filter. When a cell, during filtering, contains or is applied to more than one pixel value (e.g., at small depths), the filter weight may be applied to any suitable value representative of the multiple pixel values such as an average of the pixel values or a median filter value of the pixel values. When multiple cells, during filtering, contains or are to be applied to the same pixel value (e.g., at large depths), the filter weights for the adjacent cells may be applied to the same pixel values for adjacent cells.

As discussed with respect to FIG. 3, for each of the feature maps from the same size filters of a 3D segment, there is one pathway to the fully connected layers such that differing size filters have a differing pathway to the fully connected layers. Furthermore, during training and implementation, filters of different sizes are applied to 3D image segments at differing depths such that multi-scale features are extracted and analyzed. Such multi-scale features are trained in the training phase to provide weights for filters of differing sizes. The filter sizes are selected to represent expected object depths during implementation. For example, larger filter sizes are implemented to advantageously detect objects expected at depth d11 and smaller filter sizes are implemented to advantageously detect objects expected at depth d12, as discussed with respect to FIG. 3 such that depth d11 is less than depth d12. During training and implementation, the use of multiple filter sizes supports object detection at all depths to provide a more accurate CNN.

Returning to FIG. 3, as discussed, multi-scale features are extracted and propagated through CNN 300 such that convolutional layer 307 includes 3D filters 303 of a first scale or size and 3D filters 305 of a second scale or size. CNN 300 may be trained using any suitable technique or techniques.

Figure 6:
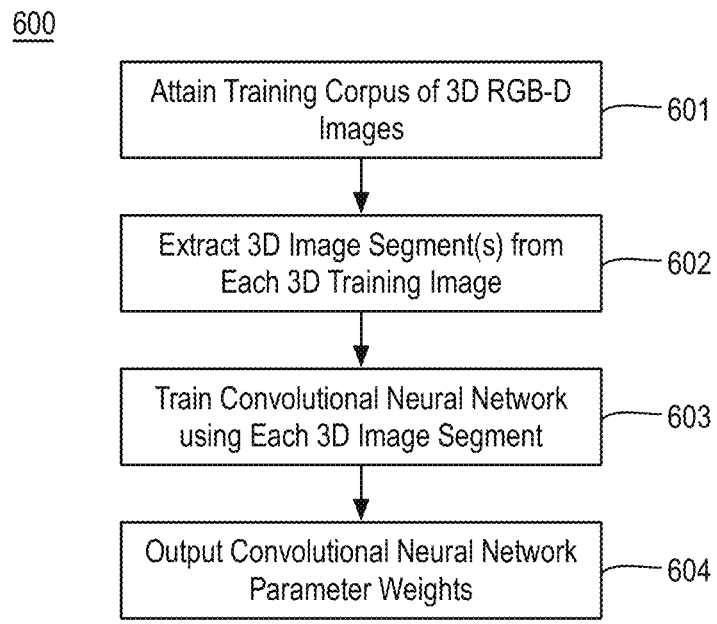
FIG. 6 is a flow diagram illustrating an example process for training a 3D convolutional neural network having multi-scale filters.

FIG. 6 is a flow diagram illustrating an example process 600 for training a 3D convolutional neural network having multi-scale filters, arranged in accordance with at least some implementations of the present disclosure. Process 600 may include one or more operations 601-604 as illustrated in FIG. 6. Process 600 may be performed by any device or system discussed herein to train any 3D CNN having multi-scale filters as discussed herein. Process 600 or portions thereof may be repeated for any 3D CNN training, training sets, etc. Process 600 may be used to train CNN 300, CNN 800, or any CNN discussed herein. The parameter weights generated by process 600 may be stored to memory and implemented via a processor, for example.

Process 600 begins at operation 601, where a training corpus of RGB-D image data or any suitable format of 3D image data may be attained. The training corpus or training data may include any suitable corpus of 3D images such as 3D images having objects that are to be detected by the 3D CNN labeled with accurate labels as well as false objects. Processing continues at operation 602, where one or more 3D segments are extracted from each of the 3D training images. Such 3D segment extraction may be performed using any suitable technique or techniques such as those discussed with respect to segmentation module 102. In an embodiment, 3D image data corresponding to each input 3D input image is provided in a 3D point cloud representation segmentation includes 3D spatial clustering such that points of the point clouds that are clustered together are combined into a particular 3D image segment.

Processing continues at operation 603, where each 3D image segment attained at operation 602 is used to train the CNN. In an embodiment, CNN parameter weights for implementation of the CNN, including filter weights and fully connected layer weights are generated using each 3D image segment based on back propagation training techniques. For example, CNN filter sizes, numbers, strides, and channels may be preformatted or selected for a multi-scale CNN. For example, a first convolutional layer of the CNN may include a number of filters of a first size, a number of filters of a second size, a number of filters of a third size, etc. Particular filter sizes may be selected based on the expected spatial size of objects to be detected. In an embodiment, each filter size is made up a corresponding number of cells of the same size. For example, large filters may have 10×10×10 cells 10×10× 10 cells of a set size, medium filters may have 6×6×6 cells of the same size, and small filters may have 4×4×4 cells of the same size. For example, for motor vehicle vision applications, each cell may be $(0.1 \text{ m})^3$. However, any numbers of cells of any suitable sizes may be used. Similar characteristics may be predetermined for pooling to generate feature maps, filtering and pooling for other convolutional layers, etc. For example, any characteristics discussed herein with respect to CNN 300, CNN 800, or any other CNN with respect to filter numbers, sizes, pooling characteristics, strides, and channels may be selected.

During training, such CNN characteristics may be used and CNN parameter weights may be trained. for example, the CNN characteristics may be fixed and the CNN parameter weights may be initially randomized to establish random CNN parameter weights. Then, at each training stage, the CNN is applied, in a forward pass, to a 3D image segment that is passed through the entire CNN. The resultant object recognition data (e.g., probabilities of each label) are then provided to a loss function using the known object label to define a loss or error using any suitable technique or techniques such as mean squared error between the resultant object recognition data and the target object recognition data (i.e., the known label target). A backward pass through the CNN may then be made to determine weights that contributed the most to the loss or error and modifying them to reduce or minimize the loss or error. The CNN parameter weights are thereby adjusted and processing continues with addition training 3D image segments. Furthermore, some or all training 3D image segments may be used again in an iterative manner. Such processing may continue until a loss target is met for a particular subset of images, after a fixed number of iterations, or the like.

Processing continues at operation 604, where the resultant CNN parameter weights are output. For example, the selected CNN characteristics and resultant CNN parameter weights after training may be stored to memory and/or transmitted to another device for implementation.

Figure 7:
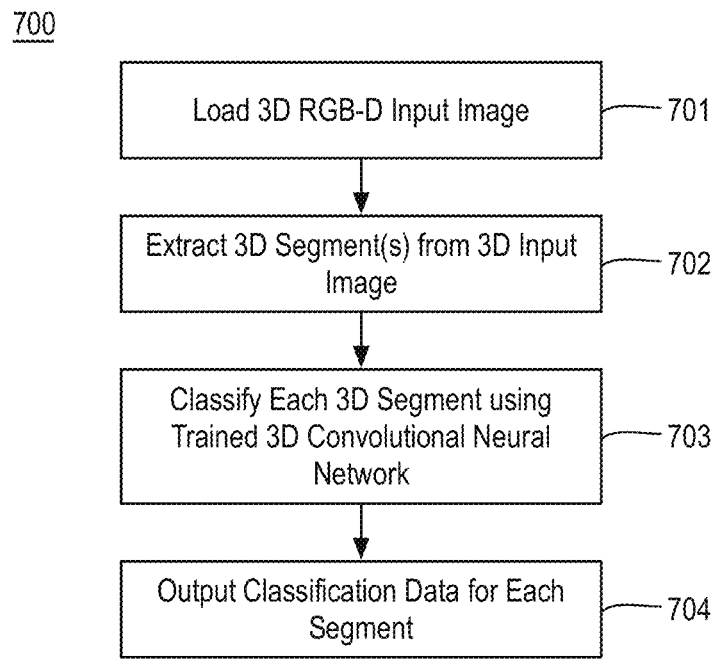
FIG. 7 is a flow diagram illustrating an example process for implementing a 3D convolutional neural network having multi-scale filters.

FIG. 7 is a flow diagram illustrating an example process 700 for implementing a 3D convolutional neural network having multi-scale filters, arranged in accordance with at least some implementations of the present disclosure. Process 700 may include one or more operations 701-704 as illustrated in FIG. 7. Process 700 may be performed by any device or system discussed herein such as device 100 to implement any 3D CNN having multi-scale filters as discussed herein. Process 600 or portions thereof may be repeated for any number of 3D input images. Process 700 may be used to implement CNN 300, CNN 800, or any CNN discussed herein.

Process 700 begins at operation 701, where an input RGB-D image, input RGB-D image data, or any suitable format of 3D image data is loaded for processing. For example, an input RGB-D image may be loaded from memory. Notably, the 3D input image may be representative of a scene expected to include an object that may be recognized via a CNN implemented at operation 703. Processing continues at operation 702, where one or more 3D segments are extracted from 3D image loaded at operation 701. Such 3D segment extraction may be performed using any suitable technique or techniques such as those discussed with respect to segmentation module 102 and/or operation 602.

Processing continues at operation 703, where each 3D image segment attained at operation 703 is provided, in turn, to a pretrained CNN for classification. The pretrained CNN may be any CNN discussed herein such as a CNN pretrained using process 600. In an embodiment, CNN parameter weights attained using process 600 are implemented via a CNN at process 700. In an embodiment, the CNN includes a first convolutional layer having multiple 3D filters of a first size and multiple 3D filters of a second size as discussed herein. Each of the 3D filters, and optional pooling operations, are applied to the input 3D image segment to generate corresponding feature maps of different sizes. Each size of filter map has a pathway to a fully connected layer of the CNN. For example, feature maps from filters of the first size (e.g., a larger size) and corresponding pooling operations may be provided to a second convolutional layer of the CNN, the second convolutional layer including filters applicable to the size of feature maps attained using filters of the first size and pooling operations. The second convolutional layer may also include multiple 3D filters and optional pooling operations to generate additional feature maps, which may be provided to the fully connected layer as feature vectors. Alternatively, other convolutional layers may be applied to generate feature maps, which may be provided to the fully connected layer as feature vectors. Furthermore, feature maps from filters of a second size (e.g., a smaller size) and corresponding pooling operations may bypass at least a final convolutional layer and may be directly provided to the fully connected layer as feature vectors. The fully connected layers process such feature vectors (e.g., those received directly from the first convolutional layer and those received from intervening convolutional layers) simultaneously to generate an output layer of object recognition data.

Processing continues at operation 704, where the object recognition data or object classification data are output. Such object classification data may include any suitable data such as probabilities of likelihoods any number of object labels correspond to the input image segment, a highest likelihood object label and corresponding likelihood, etc. Such object recognition data or object classification data may be used in a variety of applications such as autonomous driving applications, autonomous robot applications, etc. In some embodiments, an object label may be presented to a user. In some embodiments, the object recognition data or object classification data may be provided to an object tracking application.

Figure 8:
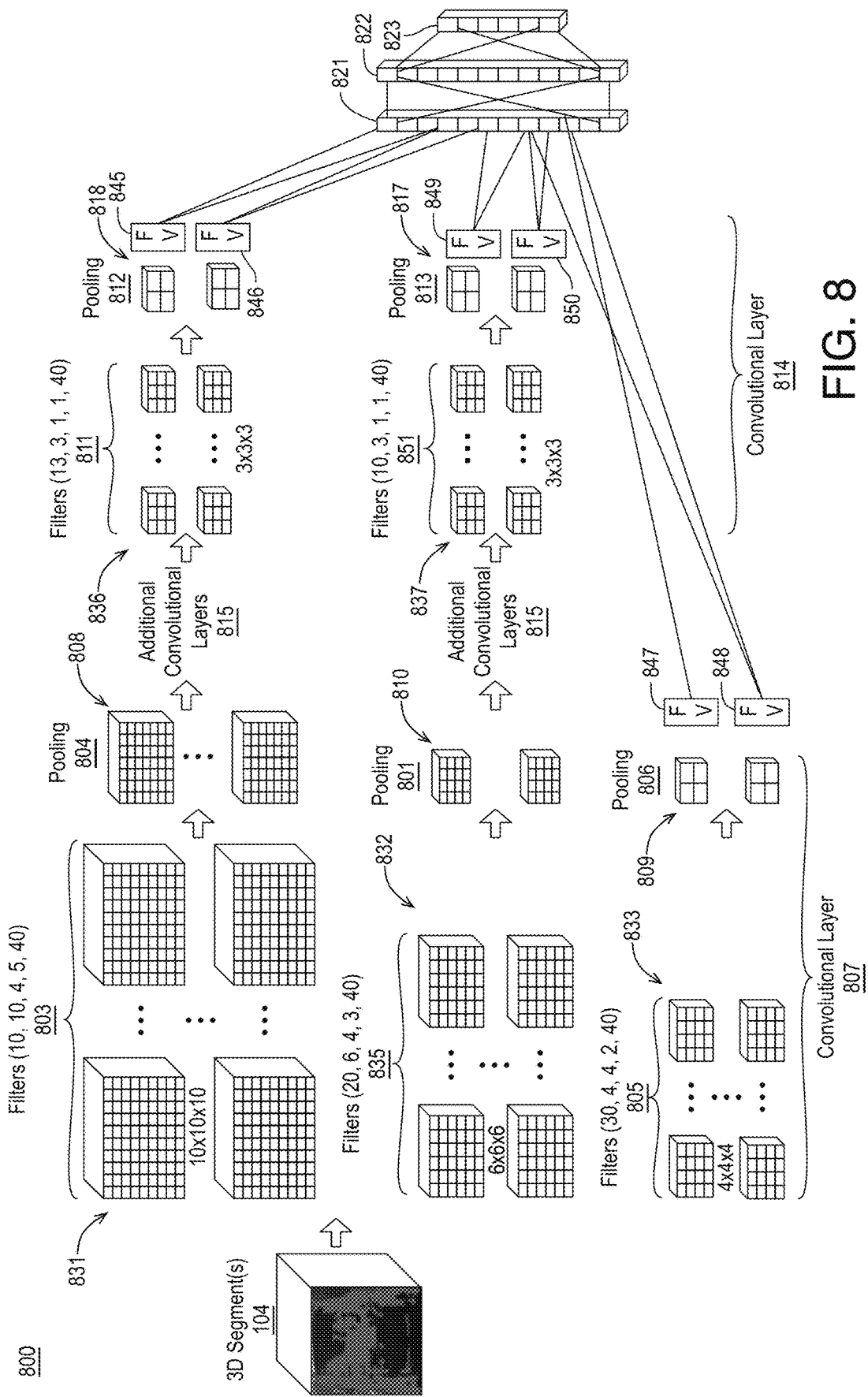
FIG. 8 illustrates another example convolutional neural network for object recognition.

FIG. 8 illustrates an example convolutional neural network 800 for object recognition, arranged in accordance with at least some implementations of the present disclosure. For example, convolutional neural network (CNN) 800 may be implemented by CNN module 103 for object detection in autonomous driving applications. Although illustrated and discussed with example CNN characteristics for autonomous driving applications, CNN 800 may be used in any suitable application. As shown, CNN 800 includes a convolutional layer 807 that receives 3D image segments 104 (e.g., convolutional layer 807 is a first convolutional layer of CNN 800), any number of additional convolutional layers 815, and a convolutional layer 814 such that convolutional layer 814 is immediately adjacent to fully connected layers 821, 822. (e.g., convolutional layer 814 is a final convolutional layer of CNN 800).

CNN 800 receives 3D image segments 104, which may be segmented from 3D input image data as discussed herein. Each of 3D image segments 104 may be, for example, an RGB-D format image segment, which, as illustrated, represents a 3D segment of 3D image data that is expected to include an object to be classified that is pertinent to an autonomous driving application. CNN 800 may include any number of convolutional layers 807, 814, 815. In an embodiment, CNN 800 includes first convolutional layer 807 and final convolutional layer 814 without additional convolutional layers 815. Notably, when implemented, convolutional layers 815 may include 3D filters and pooling modules (not shown) as discussed with respect to convolutional layers 807, 814. In an embodiment, feature maps 808 (as generated by large size 3D filters 803) and feature maps 810 (as generated by medium size filters 835) are provided to convolutional layer 815 while feature maps 809 (as generated by small size 3D filters 805) bypass convolutional layers 815 and convolutional layer 814. In an embodiment, feature maps 808 (as generated by large size 3D filters 803) and feature maps 810 (as generated by medium size filters 835) are provided to convolutional layer 814 while feature maps 809 (as generated by small size 3D filters 805) bypass convolutional layers 814.

As shown, each of 3D feature maps 808, 809, 810 have a pathway to fully connected layer 821, fully connected layer 822, and output layer 823. In operation, each 3D filter 831 of 3D filters 803, each 3D filter 832 of 3D filters 835, and each 3D filter 833 of 3D filters 805 are applied, separately, to receptive fields of 3D image segment 104 and each 3D filter 831 is moved within 3D image segment 104 to another receptive field, and so on, to generate 3D feature maps, which may be pooled by pooling modules 804, 801, 806 to form feature maps 808, 810, 809, respectively. Filter weights of each 3D filter 831, 832, 833 are pretrained in a training phase for implementation in an implementation phase. Each 3D filter 831, 832, 833 is tuned to detect a particular feature relevant to object detection within 3D image segment 104.

Similarly, each of 3D feature maps 808, 810 are provided to a convolutional layer including multiple 3D filters and corresponding pooling modules of convolutional layers 815 (if any) for processing as discussed above. The resultant 3D feature maps (or feature maps 808, 810 if no additional convolutional layers 815 are implemented), are provided to convolutional layer 814, which operates as discussed with respect to convolutional layer 817 such that each 3D filter 836 of 3D filters 811 and each 3D filter 837 of 3D filters 811 are applied, separately, to receptive fields of 3D feature maps 808, 810 and then are moved within 3D feature maps 808, 810, and so on. Each 3D filter 836, 837 is tuned to detect a particular feature relevant to object detection within 3D image segment 104. Notably, each 3D filter 836, 837 may detect more abstract features as processing through CNN 800 progresses. The results from application of each 3D filter 836, 837 are downsampled by a pooling modules 812, 813 to generate feature maps 818, 817. Feature maps 818, 817 are vectorized to feature vectors 845, 846, 849, 850 (only two of which are shown for the sake of clarity), which are provided to first fully connected layer 821. Feature vectors 845, 846, 849, 850 may be generated from feature maps 818, 817 using any suitable technique or techniques such as translating 3D results to a linear order using a scan order such as a raster scan order or the like. In an embodiment, each feature vector is an 8-element vector (corresponding to 2×2×2 3D feature maps), although any size may be used. Such feature vectors may be characterized as feature maps, neural features, neural feature vectors, or the like As shown, feature maps 809 are vectorized to feature vectors 847, 848 (only two of which are shown for the sake of clarity), which are provided (along with other feature vectors) to first fully connected layer 821. Notably, feature maps 809 bypass convolutional layers 815, 814. Furthermore, the 3D spatial size of each of 3D filters 805 is less than the 3D spatial size of each of 3D filters 835, which is, in turn, less than the 3D spatial size of each of 3D filters 805. In the illustrated embodiment, each of 3D filters 805 includes 4×4×4 cells such that each cell is a particular spatial size (e.g., $(0.1 \text{ m})^3$), each of 3D filters 835 includes 6×6×6 cells with each cell having the same spatial size, and each of 3D filters 803 includes 10×10×10 cells with each cell again having the same spatial size. Although illustrated with particular filter sizes, any suitable filter sizes (e.g., cell numbers and sizes) may be used.

As with CNN 300, the parameters of 3D filters (i.e., f, k, c, s, d), such that the parameters of 3D filters 803 are (10, 10, 4, 5, 40), the parameters of 3D filters 835 are (20, 6, 4, 3, 40), the parameters of 3D filters 805 are (30, 4, 4, 2, 40), the parameters of 3D filters 811 are (13, 3, 1, 1, 40), and the parameters of 3D filters 851 are (10, 10, 4, 5, 40), indicate f number of filters of the particular size, k number of cells in each of the 3-dimensions such that each filter is k×k×k cells with a total of $k^3$ cells with each cell being the same spatial size (e.g., $(0.1 \text{ m})^3$), the filter is applied at a step size s for c fibers or channels of the previous layer, with the center of an input segment being at depth d. The parameters or characteristics illustrated with respect to CNN 800 may be suitable, for example, for automotive recognition applications.

As discussed, feature vectors 845, 846, 847, 848, 849, 850 (and others) are provided to fully connected layers 821, 822 to generate object recognition data 105 at output layer 823. For example, fully connected layer 821 may receive any number of feature vectors concatenated into a one dimensional array. For example, each feature vector may be an 8-element vector and, for N feature vectors, fully connected layer 821 has 8×N nodes or elements to receive the feature vectors. Although illustrated with two fully connected layers 821, 822, CNN 800 may include any number of fully connected layers such as three, four, or more. Each of fully connected layers 821, 822 may have any number of inputs and outputs. Output layer 823 includes any number of outputs for any number of object labels (e.g., bike, car, truck, pedestrian, etc. in a motor vehicle context) and output layer 823 may provide respective probability values for the object labels. For example, fully connected layers 821, 822 may provide fully connected and weighted network nodes and fully connected output layer 823 may provide a fully connected softmax functions or the like. In some embodiments, object recognition data 105 includes an object label having the highest probability value of the available object label outputs from fully connected layer 823. CNN 800 may be generated or pretrained using any suitable technique or techniques such as those discussed with respect to FIG. 6.

Figure 9:
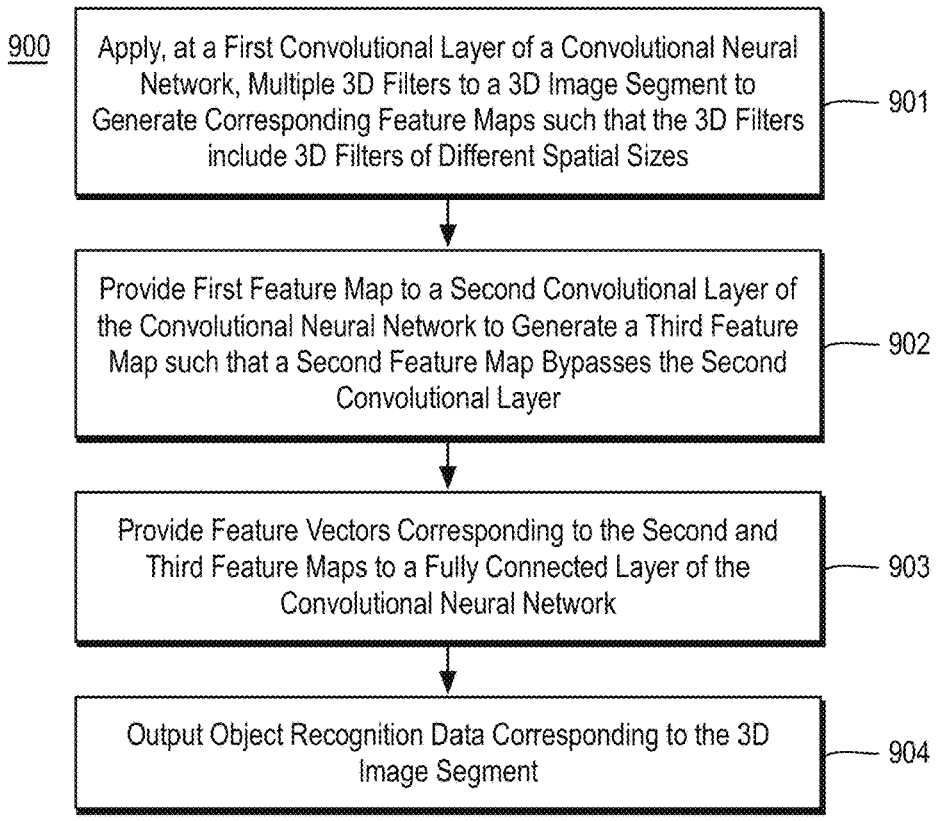
FIG. 9 is a flow diagram illustrating an example process for performing object recognition.

FIG. 9 is a flow diagram illustrating an example process 900 for performing object recognition, arranged in accordance with at least some implementations of the present disclosure. Process 900 may include one or more operations 901-904 as illustrated in FIG. 9. Process 900 may form at least part of an object recognition process. By way of non-limiting example, process 900 may form at least part of an object recognition process performed by device 100 as discussed herein during an implementation phase. Furthermore, process 900 will be described herein with reference to system 1000 of FIG. 10.

Figure 10:
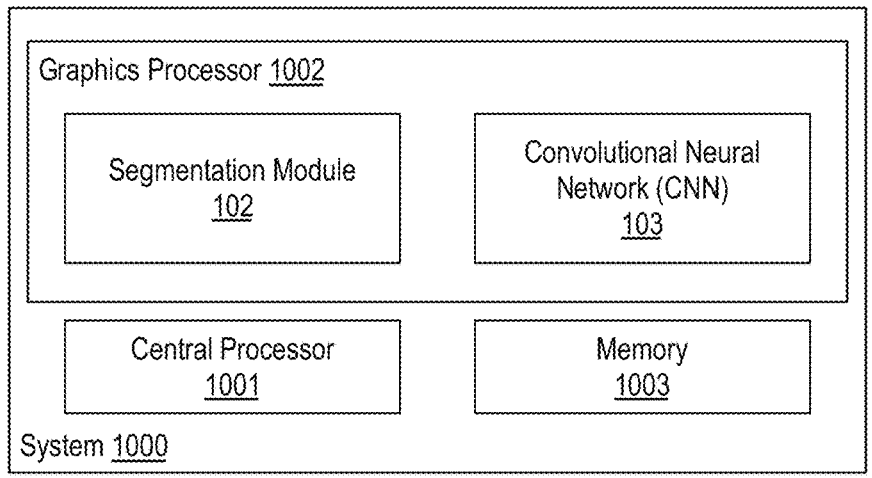
FIG. 10 is an illustrative diagram of an example system for performing object recognition.

FIG. 10 is an illustrative diagram of an example system 1000 for performing object recognition, arranged in accordance with at least some implementations of the present disclosure. As shown in FIG. 10, system 1000 may include one or more central processing units (CPU) 1001, a graphics processing unit 1002, and memory stores 1003. Also as shown, graphics processing unit 1002 may include segmentation module 102 and CNN module 103. Such modules may be implemented to perform operations as discussed herein. In the example of system 1000, memory stores 1003 may store 3D input image data, 3D image segment data, CNN characteristics and parameters data, binary neural features, object labels, image layer data, object recognition, or any other data or data structure discussed herein.

As shown, in some examples, segmentation module 102 and CNN module 103 are implemented via graphics processing unit 1002. In other examples, one or both or portions of segmentation module 102 and CNN module 103 are implemented via central processing units 1001 or an image processing unit (not shown) of system 1000. In yet other examples, one or both or portions of segmentation module 102 and CNN module 103 may be implemented via an imaging processing pipeline, graphics pipeline, or the like.

Graphics processing unit 1002 may include any number and type of graphics processing units, that may provide the operations as discussed herein. Such operations may be implemented via software or hardware or a combination thereof. For example, graphics processing unit 1002 may include circuitry dedicated to manipulate 3D image data, CNN data, etc. obtained from memory stores 1003. Central processing units 1001 may include any number and type of processing units or modules that may provide control and other high level functions for system 1000 and/or provide any operations as discussed herein. Memory stores 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1003 may be implemented by cache memory. In an embodiment, one or both or portions of segmentation module 102 and CNN module 103 are implemented via an execution unit (EU) of graphics processing unit 1002. The EU may include, for example, programmable logic or circuitry such as a logic core or cores that may provide a wide array of programmable logic functions. In an embodiment, one or both or portions of segmentation module 102 and CNN module 103 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or both or portions of segmentation module 102 and CNN module 103 are implemented via an application specific integrated circuit (ASIC). The ASIC may include an integrated circuitry customized to perform the operations discussed herein.

Returning to discussion of FIG. 9, process 900 begins at operation 901, where, at a first convolutional layer of a convolutional neural network, multiple 3D filters are applied to a 3D image segment to generate multiple feature maps such that a first 3D filter of the plurality of 3D filters has a first 3D spatial size and a second 3D filter of the plurality of filters has a second 3D spatial size less than the first 3D spatial size. The first and second 3D filters may have any spatial sizes discussed herein. In an embodiment, the first 3D filter and the second 3D filter each includes multiple 3D cells having the same spatial size such that the first 3D filter includes more 3D cells than the second 3D filter. In an embodiment, the same spatial size for each 3D cell is in the range of $(0.05 \text{ m})^3$ to $(0.15 \text{ m})^3$, the first 3D filter has, for each dimension thereof, in the range of 8 to 15 3D cells, and the second 3D filter has, for each dimension thereof, in the rage of 4 to 8 3D cells. In an embodiment, wherein the 3D image segment comprises a representation of a 3D segment of a 3D input image and the 3D image segment comprises an RGB-D format 3D image segment. In an embodiment, process 900 further includes segmenting the 3D image segment from the 3D input image by applying 3D spatial clustering to the 3D image segment.

In an embodiment, process 900 further includes applying the multiple 3D filters to a second 3D image segment to generate multiple second feature maps such that the second 3D image segment is at a greater depth than the 3D image segment and, in response to the 3D image segment being at a greater depth than the second 3D image segment, each cell of the first 3D filter is applied to a greater number of pixels of the second 3D image segment than of the 3D image segment. In an embodiment, the 3D image segment and the second 3D image segment are both a part of a same 3D input image, and the 3D image segment being at a greater depth than the second 3D image segment comprises the 3D image segment being at a greater distance than the second 3D image segment to an image sensor used to acquire the 3D input image. In an embodiment, the plurality of 3D filters comprise a first plurality of 3D filters of the first 3D spatial size including the first 3D filter, a second plurality of 3D filters of the second 3D spatial size including the second 3D filter, and a third plurality of 3D filters of a third 3D spatial size, wherein the third 3D spatial size less than the second 3D spatial size.

Processing continues at operation 902, where a first feature map corresponding to the first 3D filter is provided to a second convolutional layer of the convolutional neural network to generate a third feature map such that a second feature map corresponding to the second 3D filter bypasses the second convolutional layer. In an embodiment, the second convolutional layer is a final convolutional layer of the convolutional neural network such that the second convolutional layer is immediately adjacent to a fully connected layer of the convolutional neural network. In an embodiment, the convolutional neural network further includes one or more convolutional layers between the first and second convolutional layers. In an embodiment, the first convolutional layer and the second convolutional layer each comprise at least a convolutional filter layer and a pooling layer.

Processing continues at operation 903, where a first feature vector corresponding to the third feature map and a second feature vector corresponding to the second feature map are provided to a fully connected layer of the convolutional neural network. In an embodiment, the first and second feature vectors are generated from the first and second feature maps, respectively, by translating the 3D feature maps to a linear order using a scan order. In an embodiment, the scan order is a raster scan order.

Processing continues at operation 904, where object recognition data corresponding to the 3D image segment are output based on application of the fully connected layer to the first and second feature vectors. The fully connected layer and one or more additional fully connected layers may be applied using any suitable technique or techniques. Furthermore, the object recognition data may include any suitable data format such as probabilities that each of a list of object labels are applicable to the 3D image segment.

In an embodiment, the convolutional neural network applied via process 900 is pretrained. In an embodiment, process 900 further includes segmenting a plurality of 3D image segments from each of a corpus of 3D input images, applying one of a plurality of object recognition labels to each of the plurality of 3D image segments, and training the convolutional neural network using the plurality of 3D image segments and the plurality of object recognition labels to determine parameters weights of the convolutional neural network.

Process 900 may provide for generating object recognition data or object label data based on 3D input image segment input image data. Process 900 may be repeated any number of times either in series or in parallel for any number of 3D input image segments, 3D input images, or the like. As discussed, process 900 may provide for high quality object recognition results.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
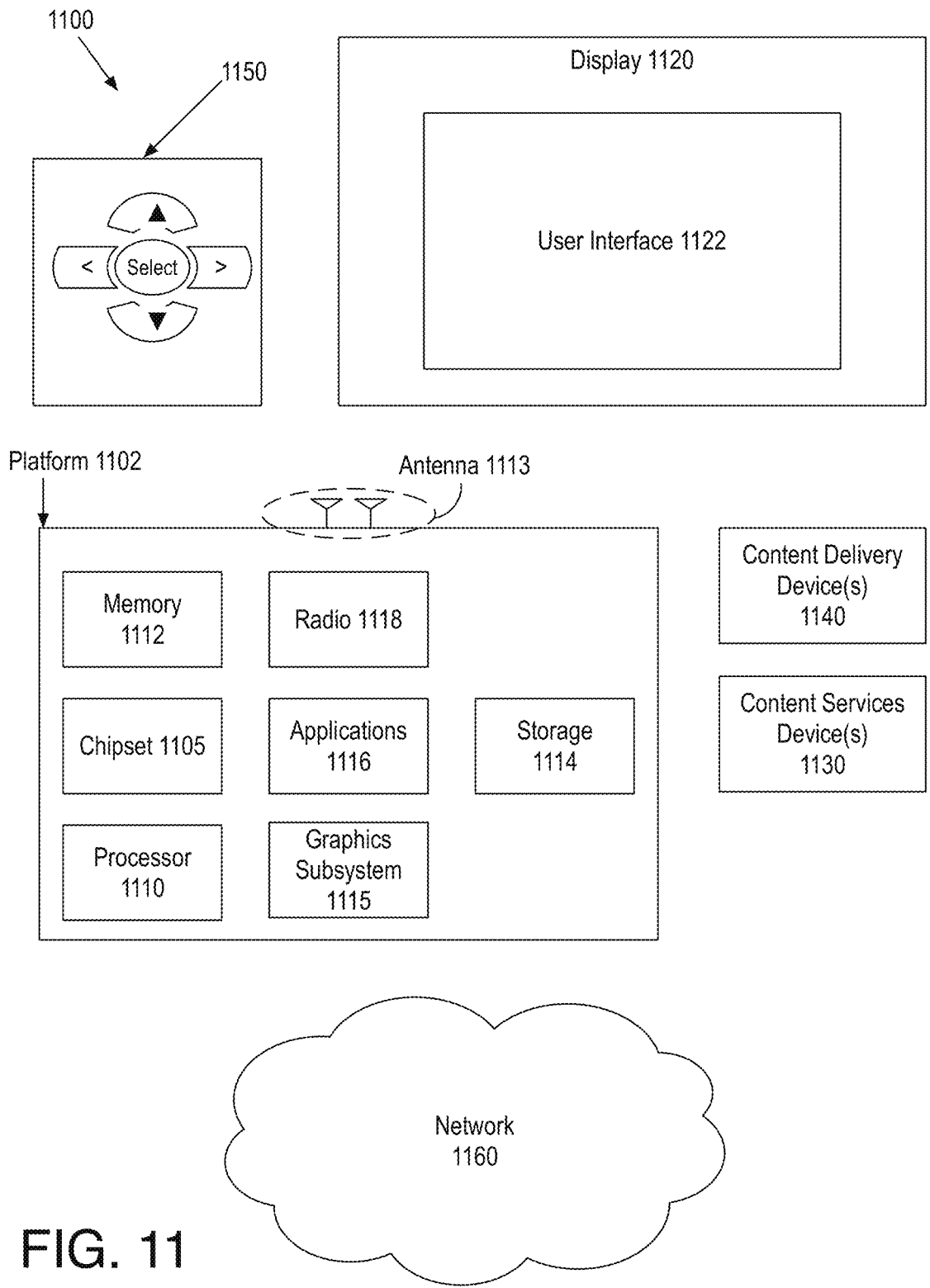
FIG. 11 is an illustrative diagram of an example system.

FIG. 11 is an illustrative diagram of an example system 1100, arranged in accordance with at least some implementations of the present disclosure. In various implementations, system 1100 may be a computing system although system 1100 is not limited to this context. For example, system 1100 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, peripheral device, gaming console, wearable device, display device, all-in-one device, two-in-one device, and so forth.

In various implementations, system 1100 includes a platform 1102 coupled to a display 1120. Platform 1102 may receive content from a content device such as content services device(s) 1130 or content delivery device(s) 1140 or other similar content sources such as a camera or camera module or the like. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still images, graphics, or video for display. Graphics subsystem 1115 may be a graphics processing unit (GPU), a visual processing unit (VPU), or an image processing unit, for example. In some examples, graphics subsystem 1115 may perform scanned image rendering as discussed herein. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any flat panel monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR.) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 10.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
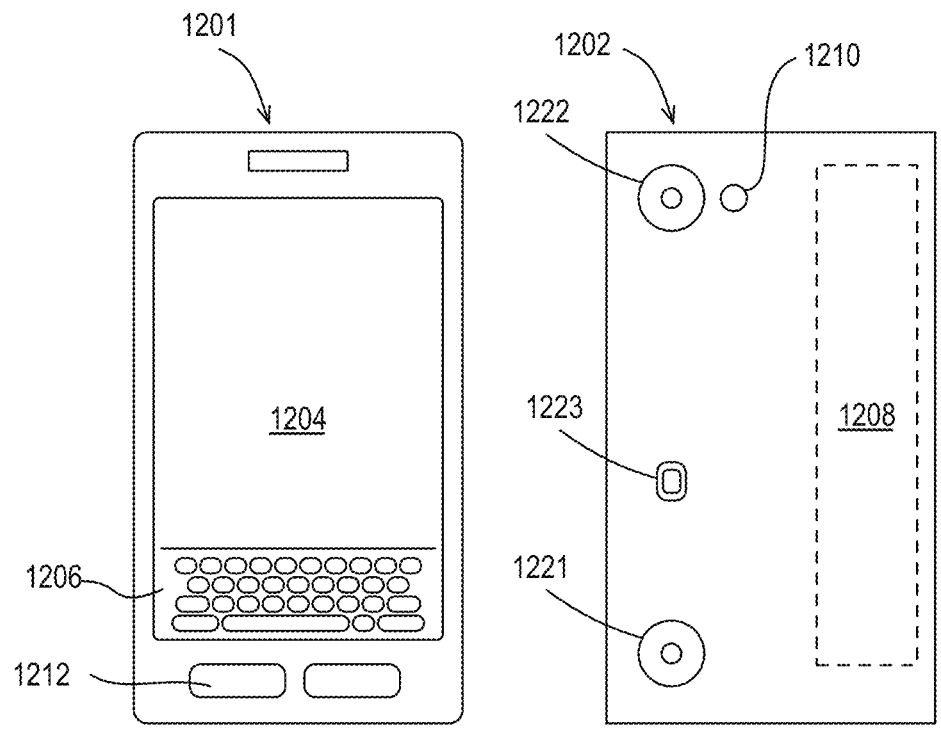
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems, components, or modules discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, a color camera 1221, a color camera 1222, an infrared transmitter 1223, and an integrated antenna 1208. For example, color camera 1221, color camera 1222, and infrared transmitter 1223 may attain 3D image data as discussed herein. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include color cameras 1221, 1222, infrared transmitter 1223, and a flash 1210 integrated into back 1202 (or elsewhere) of device 1200. In other examples, color cameras 1221, 1222, infrared transmitter 1223, and flash 1210 may be integrated into front 1201 of device 1200 or both front and back sets of cameras may be provided. Color cameras 1221, 1222 and a flash 1210 may be components of a camera module to originate color image data with IR texture correction that may be processed into an image or streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for performing object recognition comprising:
   a memory to store a three-dimensional (3D) image segment; and
   a processor coupled to the memory, the processor to:
   apply, at a first convolutional layer of a convolutional neural network, a plurality of 3D filters to the 3D image segment to generate a plurality of feature maps, wherein a first 3D filter of the plurality of 3D filters has a first 3D spatial size and a second 3D filter of the plurality of filters has a second 3D spatial size that is smaller than the first 3D spatial size, and wherein the first 3D filter and the second 3D filter each comprises a plurality of 3D cells having the same spatial size, wherein the first 3D filter comprises more 3D cells than the second 3D filter;
   provide at least a first feature map corresponding to the first 3D filter to a second convolutional layer of the convolutional neural network to generate a third feature map, wherein a second feature map corresponding to the second 3D filter bypasses the second convolutional layer;
   provide a first feature vector corresponding to the third feature map and a second feature vector corresponding to the second feature map to a fully connected layer of the convolutional neural network; and
   output object recognition data corresponding to the 3D image segment based on application of the fully connected layer to the first and second feature vectors.

2. The system of claim 1, wherein the first 3D filter has, for each dimension thereof, 8 to 15 3D cells, and the second 3D filter has, for each dimension thereof, 4 to 8 3D cells.

3. The system of claim 1, the processor to:
   apply the plurality of 3D filters to a second 3D image segment to generate a plurality of second feature maps, wherein the second 3D image segment is at a greater depth than the 3D image segment and wherein, in response to the 3D image segment being at a greater depth than the second 3D image segment, each cell of the first 3D filter is applied to a greater number of pixels of the second 3D image segment than of the 3D image segment.

4. The system of claim 3, wherein the 3D image segment and the second 3D image segment are both a part of a 3D input image, and the 3D image segment being at a greater depth than the second 3D image segment comprises the 3D image segment being at a greater distance than the second 3D image segment to an image sensor used to acquire the 3D input image.

5. The system of claim 1, wherein the convolutional neural network further comprises one or more convolutional layers between the first and second convolutional layers.

6. The system of claim 1, wherein the plurality of 3D filters comprises a first plurality of 3D filters of the first 3D spatial size including the first 3D filter, a second plurality of 3D filters of the second 3D spatial size including the second 3D filter, and a third plurality of 3D filters of a third 3D spatial size, wherein the third 3D spatial size less than the second 3D spatial size.

7. The system of claim 1, wherein the first convolutional layer and the second convolutional layer each comprise at least a convolutional filter layer and a pooling layer.

8. The system of claim 1, wherein the 3D image segment comprises a representation of a 3D segment of a 3D input image and the 3D image segment comprises an RGB-D format 3D image segment.

9. The system of claim 1, the processor to:
segment the 3D image segment from a 3D input image by application of 3D spatial clustering to the 3D image segment.

10. The system of claim 1, the processor to:
segment a plurality of 3D image segments from each of a corpus of 3D input images;
apply one of a plurality of object recognition labels to each of the plurality of 3D image segments; and
train the convolutional neural network using the plurality of 3D image segments and the plurality of object recognition labels to determine parameters weights of the convolutional neural network.

11. A computer-implemented method for performing object recognition comprising:
applying, at a first convolutional layer of a convolutional neural network, a plurality of three-dimensional (3D) filters to a 3D image segment to generate a plurality of feature maps, wherein a first 3D filter of the plurality of 3D filters has a first 3D spatial size and a second 3D filter of the plurality of filters has a second 3D spatial size that is smaller than the first 3D spatial size, and wherein the first 3D filter and the second 3D filter each comprises a plurality of 3D cells having the same spatial size, wherein the first 3D filter comprises more 3D cells than the second 3D filter;
providing at least a first feature map corresponding to the first 3D filter to a second convolutional layer of the convolutional neural network to generate a third feature map, wherein a second feature map corresponding to the second 3D filter bypasses the second convolutional layer;
providing a first feature vector corresponding to the third feature map and a second feature vector corresponding to the second feature map to a fully connected layer of the convolutional neural network; and
outputting object recognition data corresponding to the 3D image segment based on application of the fully connected layer to the first and second feature vectors.

12. The method of claim 11, further comprising: applying the plurality of 3D filters to a second 3D image segment to generate a plurality of second feature maps, wherein the second 3D image segment is at a greater depth than the 3D image segment and wherein, in response to the 3D image segment being at a greater depth than the second 3D image segment, each cell of the first 3D filter is applied to a greater number of pixels of the second 3D image segment than the 3D image segment.

13. The method of claim 11, wherein the convolutional neural network further comprises one or more convolutional layers between the first and second convolutional layers.

14. The method of claim 11, wherein the plurality of 3D filters comprises a first plurality of 3D filters of the first 3D spatial size including the first 3D filter, a second plurality of 3D filters of the second 3D spatial size including the second 3D filter, and a third plurality of 3D filters of a third 3D spatial size, wherein the third 3D spatial size less than the second 3D spatial size.

15. The method of claim 11, wherein the 3D image segment comprises a representation of a 3D segment of a 3D input image and the 3D image segment comprises an RGB-D format 3D image segment.

16. At least one non-transitory machine readable medium comprising a plurality of instructions that, in response to being executed on a computing device, cause the computing device to perform object recognition by:
applying, at a first convolutional layer of a convolutional neural network, a plurality of a three-dimensional (3D) filters to a 3D image segment to generate a plurality of feature maps, wherein a first 3D filter of the plurality of 3D filters has a first 3D spatial size and a second 3D filter of the plurality of filters has a second 3D spatial size that is smaller than the first 3D spatial size, and wherein the first 3D filter and the second 3D filter each comprises a plurality of 3D cells having the same spatial size, wherein the first 3D filter comprises more 3D cells than the second 3D filter;
providing at least a first feature map corresponding to the first 3D filter to a second convolutional layer of the convolutional neural network to generate a third feature map, wherein a second feature map corresponding to the second 3D filter bypasses the second convolutional layer;
providing a first feature vector corresponding to the third feature map and a second feature vector corresponding to the second feature map to a fully connected layer of the convolutional neural network; and
outputting object recognition data corresponding to the 3D image segment based on application of the fully connected layer to the first and second feature vectors.

17. The non-transitory machine readable medium of claim 16, further comprising instructions that, in response to being executed on the computing device, cause the computing device to perform object recognition by:
applying the plurality of 3D filters to a second 3D image segment to generate a plurality of second feature maps, wherein the second 3D image segment is at a greater depth than the 3D image segment and wherein, in response to the 3D image segment being at a greater depth than the second 3D image segment, each cell of the first 3D filter is applied to a greater number of pixels of the second 3D image segment than of the 3D image segment.

18. The non-transitory machine readable medium of claim 16, wherein the convolutional neural network further comprises one or more convolutional layers between the first and second convolutional layers.

19. The non-transitory machine readable medium of claim 16, wherein the plurality of 3D filters comprises a first plurality of 3D filters of the first 3D spatial size including the first 3D filter, a second plurality of 3D filters of the second 3D spatial size including the second 3D filter, and a third plurality of 3D filters of a third 3D spatial size, wherein the third 3D spatial size less than the second 3D spatial size.

20. The non-transitory machine readable medium of claim 16, wherein the 3D image segment comprises a representation of a 3D segment of a 3D input image and the 3D image segment comprises an RGB-D format 3D image segment.

21. The non-transitory machine readable medium of claim 16, further comprising instructions that, in response to being executed on the computing device, cause the computing device to perform object recognition by:
segmenting the 3D image segment from a 3D input image by application of 3D spatial clustering to the 3D image segment.

* * * * *